US008656295B2

(12) United States Patent
Decker

(10) Patent No.: US 8,656,295 B2
(45) Date of Patent: Feb. 18, 2014

(54) SELECTING AND MANIPULATING WEB CONTENT

(75) Inventor: Kevin Decker, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1130 days.

(21) Appl. No.: 11/620,492

(22) Filed: Jan. 5, 2007

(65) Prior Publication Data

US 2008/0168388 A1    Jul. 10, 2008

(51) Int. Cl.
*G06F 3/048*    (2013.01)

(52) U.S. Cl.
USPC ......................................................... 715/770

(58) Field of Classification Search
USPC ................................ 715/770, 800, 822, 823
See application file for complete search history.

(56) References Cited

U.S. PATENT DOCUMENTS

| | | | |
|---|---|---|---|
| 5,483,261 A | 1/1996 | Yasutake |
| 5,488,204 A | 1/1996 | Mead et al. |
| 5,513,309 A | 4/1996 | Meier et al. |
| 5,625,763 A | 4/1997 | Cirne |
| 5,825,352 A | 10/1998 | Bisset et al. |
| 5,835,079 A | 11/1998 | Shieh |
| 5,880,411 A | 3/1999 | Gillespie et al. |
| 5,914,714 A | 6/1999 | Brown |
| 5,929,852 A | 7/1999 | Fisher et al. |
| 6,188,391 B1 | 2/2001 | Seely et al. |
| 6,199,077 B1 | 3/2001 | Inala et al. |
| 6,219,679 B1 | 4/2001 | Brisebois et al. |
| 6,297,819 B1 | 10/2001 | Furst |
| 6,310,610 B1 | 10/2001 | Beaton et al. |
| 6,323,846 B1 | 11/2001 | Westerman et al. |
| 6,344,855 B1 | 2/2002 | Fisher et al. |
| 6,426,761 B1 | 7/2002 | Kanevsky et al. |
| 6,690,387 B2 | 2/2004 | Zimmerman et al. |
| 6,724,403 B1 | 4/2004 | Santoro et al. |
| 6,915,490 B1 | 7/2005 | Ewing |
| 6,947,967 B2 | 9/2005 | Ferris et al. |
| 6,976,210 B1 | 12/2005 | Silva et al. |
| 7,015,894 B2 | 3/2006 | Morohoshi |
| 7,103,838 B1 | 9/2006 | Krishnamurthy et al. |
| 7,184,064 B2 | 2/2007 | Zimmerman et al. |

(Continued)

FOREIGN PATENT DOCUMENTS

| EP | 1717673 A1 | 11/2006 |
|---|---|---|
| JP | 2000-163031 A | 6/2000 |

(Continued)

OTHER PUBLICATIONS

SnagIt (Version 7.0.2—Nov. 21, 2003).*

(Continued)

*Primary Examiner* — Thanh Vu
(74) *Attorney, Agent, or Firm* — Morrison & Foerster LLP

(57) ABSTRACT

Systems, apparatus, methods and computer program products are described for automatically resizing or repositioning an area of interest, identifying a portion of a document for display, so that the area of interest aligns with one or more edges of a structural element in the document. A method is provided that includes receiving input to resize (or reposition) an area of interest associated with a clipping of content. The clipping displays a portion of a document corresponding to the area of interest. The document has a plurality of structural elements. A boundary associated with a structural element in the document is determined. The area of interest is automatically resized (or repositioned) based on the boundary.

27 Claims, 10 Drawing Sheets

(56) References Cited

U.S. PATENT DOCUMENTS

| | | | |
|---|---|---|---|
| 7,222,306 | B2 | 5/2007 | Kaasila et al. |
| 7,478,336 | B2 | 1/2009 | Chen et al. |
| 7,490,295 | B2 | 2/2009 | Chaudhri et al. |
| 7,519,573 | B2 | 4/2009 | Helfman et al. |
| 7,663,607 | B2 | 2/2010 | Hotelling et al. |
| 8,479,122 | B2 | 7/2013 | Hotelling et al. |
| 2002/0055955 | A1 | 5/2002 | Lloyd-Jones et al. |
| 2002/0083097 | A1 | 6/2002 | Warrington |
| 2002/0112237 | A1 | 8/2002 | Kelts |
| 2003/0164861 | A1 | 9/2003 | Barbanson et al. |
| 2004/0066407 | A1 | 4/2004 | Regan et al. |
| 2004/0119747 | A1 | 6/2004 | Walker et al. |
| 2004/0133845 | A1 | 7/2004 | Forstall et al. |
| 2005/0149458 | A1 | 7/2005 | Eglen et al. |
| 2005/0246651 | A1* | 11/2005 | Krzanowski .............. 715/770 |
| 2006/0015818 | A1 | 1/2006 | Chaudhri et al. |
| 2006/0026521 | A1 | 2/2006 | Hotelling et al. |
| 2006/0197753 | A1 | 9/2006 | Hotelling |
| 2006/0277481 | A1* | 12/2006 | Forstall et al. .............. 715/764 |
| 2007/0041666 | A1 | 2/2007 | Nagamine et al. |
| 2007/0043839 | A1 | 2/2007 | Amadio et al. |
| 2007/0044039 | A1 | 2/2007 | Amadio et al. |
| 2007/0130518 | A1 | 6/2007 | Shavit et al. |
| 2007/0266011 | A1 | 11/2007 | Rohrs et al. |
| 2007/0266342 | A1 | 11/2007 | Chang et al. |

FOREIGN PATENT DOCUMENTS

| | | |
|---|---|---|
| JP | 2002-342033 A | 11/2002 |
| WO | WO 02/086739 | 10/2002 |
| WO | WO2008/085799 | 7/2008 |

OTHER PUBLICATIONS

Apple Inc., International Search Report and Written Opinion of the International Application No. PCT/US2007/089217 dated May 27, 2008, 13 pages.

Tidwell, J., "Designing Interface", O'Reilly, (Nov. 2005), 18 pages.

Action and Response History in U.S. Appl. No. 11/469,838.

International Preliminary Report on Patentability in Application No. PCT/US2007/089217, dated Jul. 7, 2009, 7 pages.

Action and Response History in U.S. Appl. No. 11/145,560.

Action and Response History in U.S. Appl. No. 11/145,023.

Final office action in U.S. Appl. No. 11/469,838, mailed Jun. 24, 2010, 19 pages.

Action and Response History in U.S. Appl. No. 11/145,561.

Non-Final Office Action in U.S. Appl. No. 11/145,560, mailed Aug. 6, 2010, 21 pages.

Fish & Richardson, Response to Non-Final Office Action in U.S. Appl. No. 11/145,560, filed Nov. 5, 2010, 20 pages.

Final Office Action in U.S. Appl. No. 11/145,560, mailed Jan. 21, 2011, 20 pages.

Fish & Richardson, Response to Final Office Action in U.S. Appl. No. 11/469,838, filed Nov. 22, 2010, 15 pages.

Fish & Richardson, Response to Final Office Action in U.S. Appl. No. 11/145,560, filed Jun. 21, 2011, 18 pages.

Fish & Richardson, Response to Final Office Action in U.S. Appl. No. 11/145,561, filed Mar. 15, 2011, 26 pages.

Non-Final Office Action in U.S. Appl. No. 11/145,561, mailed Jul. 21, 2011, 30 pages.

Fish & Richardson, Response to Non-Final Office Action in U.S. Appl. No. 11/145,561, filed Nov. 17, 2011, 25 pages.

Final Office Action in U.S. Appl. No. 11/145,561, mailed Dec. 22, 2011, 33 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

SELECTING AND MANIPULATING WEB CONTENT

RELATED APPLICATIONS

The subject matter of this application is related to the following co-pending U.S. Patent Applications:

U.S. patent application Ser. No. 11/469,838, for "Presenting and Managing Clipped Content," filed on Sep. 1, 2006;

U.S. patent application Ser. No. 11/145,560, for "Webview Applications," filed on Jun. 3, 2005;

U.S. patent application Ser. No. 10/877,968, for "Layer for Accessing User Interface Elements," filed Jun. 25, 2004;

U.S. Provisional Patent Application No. 60/583,125, for "Procedurally Expressing Graphic Objects for Web Pages," filed Jun. 25, 2004;

U.S. patent application Ser. No. 11/145,561, for "Presenting Clips of Content," filed Jun. 3, 2005;

U.S. patent application Ser. No. 11/145,577, for "Widget Authoring and Editing Environment," filed Jun. 3, 2005; and U.S. patent application Ser. No. 11/145,023, for "Widget Installer," filed Jun. 3, 2005.

Each of these applications is incorporated by reference herein in its entirety.

TECHNICAL FIELD

This disclosure relates to selecting content for presentation to users.

BACKGROUND

An electronic document can include structural elements that affect how the contents of the electronic document are presented. These structural elements have a spatial extent when the contents are presented. For example, an image, a table or a column of text can constitute a structural element.

A user may be interested in viewing or operating on only a particular selected portion of a document's content. To select a portion of content from the document, a user can provide user input identifying an area of interest with respect to the presentation of the document. For example, a portion of a web page can be selected by defining a bounding box around a portion of the page. The portion of the document's presentation that is contained by the area of interest corresponds to the selected portion. A user may prefer to select a portion of a document that corresponds to complete, discrete elements of the document. For example, users may prefer to select an image, a table or paragraph of text.

SUMMARY

Systems, apparatus, methods and computer program products are described below for automatically resizing or repositioning an area of interest, identifying a portion of a document for display, so that the area of interest aligns with one or more edges of a structural element in the document. The details of which are described below in full.

In one aspect a method is provided that includes receiving input to resize an area of interest associated with a clipping. The clipping displays a portion of a document corresponding to the area of interest. The document has a plurality of structural elements. A boundary associated with a structural element in the document is determined. The area of interest is automatically resized based on the boundary.

One or more implementations can optionally include one or more of the following features. The boundary of the structural element can identify a portion of the perimeter of the structural element. The method can include determining a snapping boundary from among a plurality of candidate snapping boundaries. Each candidate snapping boundary can be associated with one or more of the plurality of structural elements and have a respective boundary associated therewith. The method can include resizing the area of interest based on the snapping boundary. The method can include selecting the one or more candidate snapping boundaries from among the plurality of structural elements based on a direction of the user input. The method can include determining the size of one or more structural elements in the plurality of structural elements. The structural element can be selected from among the one or more structural elements based on the size of each of the one or more structural elements. The document can be a web page. The structural elements in the web page can include: document sections, tables, images, and paragraphs. Structural elements in the web page can be identified according to a respective style associated with each element. The boundary of the structural element is identified by vertical and horizontal extents, each extent identifying one side of a bounding box of the structural element.

In another aspect a method is provided that includes receiving input to move an area of interest associated with a clipping. The clipping displays a portion of a document corresponding to the area of interest. The document has a plurality of structural elements. A boundary associated with a structural element in the document is determined. The area of interest is automatically moved based on the boundary.

One or more implementations can optionally include one or more of the following features. The moving can align the area of interest with the boundary of the structural element. The boundary of the structural element can identify a portion of the perimeter of the structural element. The method can include determining a snapping boundary from among a plurality of candidate snapping boundaries. Each candidate snapping boundary can be associated with one or more of the plurality of structural elements and have a respective boundary associated therewith. The method can include moving the area of interest based on the snapping boundary. The method can include selecting the one or more candidate snapping boundaries from among the plurality of structural elements based on a direction of the user input. The method can include determining the size of one or more structural elements in the plurality of structural elements; and selecting the structural element from among the one or more structural elements based on the size of each of the one or more structural elements. The document can be a web page.

In another aspect a method is provided for receiving user input identifying a portion of a web page presentation. The web page has a plurality of structural elements. Respective boundaries associated with one or more of the structural elements in the web page are determined. A portion of the web page is selected based on the boundaries.

One or more implementations can optionally include one or more of the following features. The structural elements can correspond to HTML or XHTML elements. Receiving user input can include specifying a bounding box where the bounding box identifies the portion of the web page presentation. The identifying portion can include a part of one or more of the plurality of structural elements. Selecting the portion of the web page can include, for each given structural element being only partly identified by the identifying portion, determining whether the given structural element is completely selected based on the boundaries. The method can include presenting the selected portion of the web page presentation without presenting the unselected portion of the web page.

Other implementations are disclosed which are directed to methods, systems, apparatuses, computer-readable mediums and user interfaces.

Particular embodiments of the subject matter described in this specification can be implemented to realize none, one or more of the following advantages. A user defined area of interest can be automatically adjusted to align with a structural element, allowing users to easily create an aligned area of interest without manually aligning the area precisely. Automatic adjustment of an area of interest allows a user to easily select all or part of a structural element in a document.

The details of one or more embodiments of the invention are set forth in the accompanying drawings and the description below. Other features, aspects, and advantages of the invention will be apparent from the description and drawings, and from the claims.

DETAILED DESCRIPTION

Figure 1A:
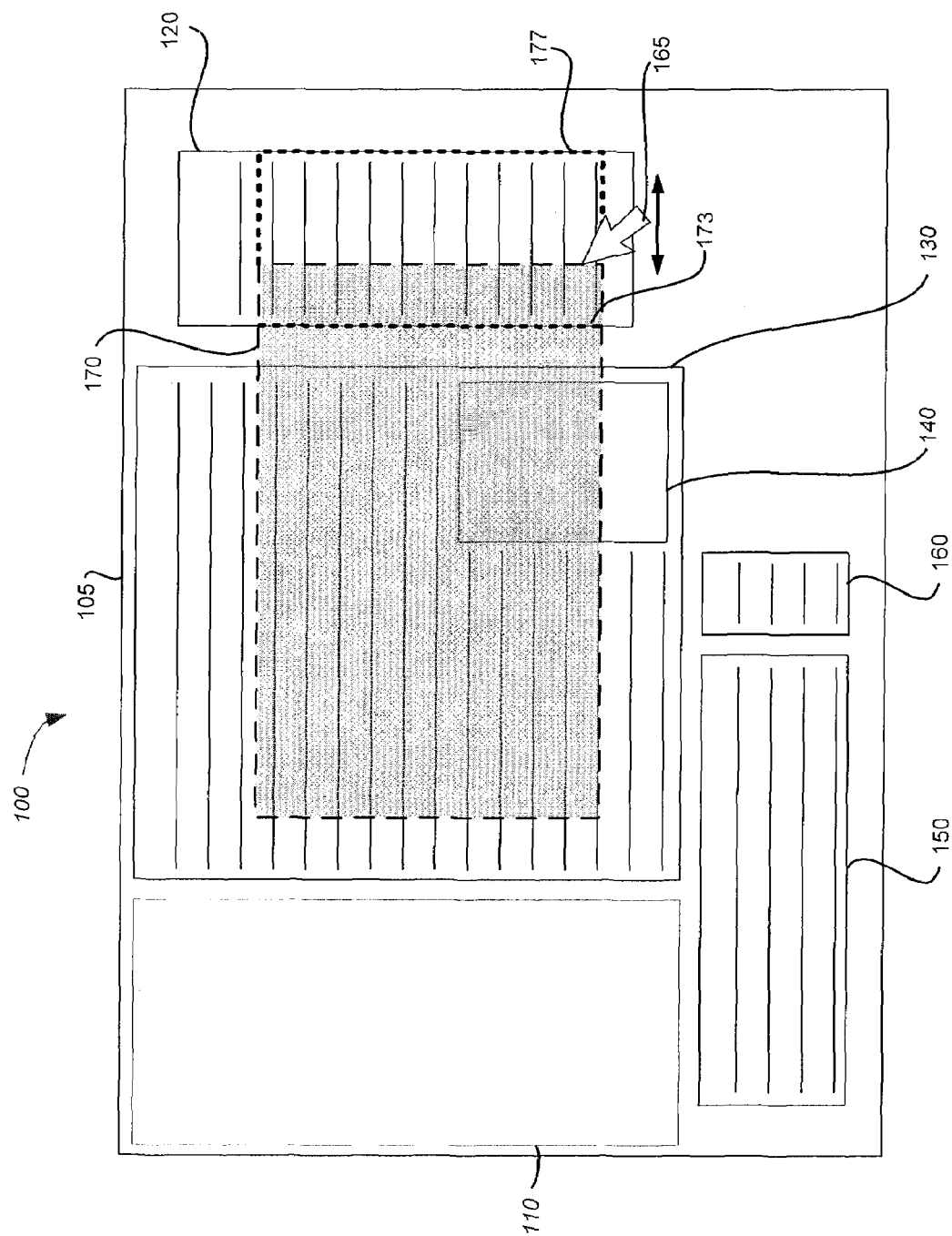
FIG. 1A is an illustration showing a selection from a structured document.

FIG. 1A is an illustration 100 of a selection 170 that forms a portion of an electronic document 105, as displayed to a user. The electronic document 105 includes multiple structural elements 110-150. In some implementations, the electronic document is a web page. The structural elements 110-150 of the document can include any discrete portion of the document that has a visual representation when the document is presented. For example, structural elements can include, document sections, a column of text, a paragraph, a table, a part of a table (e.g., cell, row or column), an image, a caption and so on. In some implementations, structural elements can include the atomic elements that constitute the document, such as words and characters. The document 105 contains many structural elements and, in general, structural elements can include other nested structural elements. For example, the section element (or text block) 130 also contains an image 140.

The structural elements of a document can include a respective boundary. The boundary of a structural element identifies the spatial extent (e.g., position, height and width) of the element's visual representation with respect to the rest of the document content. Although the boundaries of each structural element in the illustration 100 are clearly evident, in general, the boundaries of a structural element may not have a visual representation. For example, an image within a document can be a structural element that has a visual representation even though no boundary is discernable, apart from the image's inherent spatial extent.

The selection 170 of the document 105 identifies a portion of the document 105. In general, the selection 170 includes any part of the presented document. The selection 170 defines an area of interest with respect to the document. As used herein, the "area of interest" represents that portion of a document (e.g., selected document or portion of a document) that is displayed to a user in a single view. The single view can be formed using a web clipping or web view. Web clips and web views are described in greater detail in "Presenting and Managing Clipped Content." The area of interest can be selected by the user or otherwise defined. For example, the area of interest can represent a selection (e.g., selection 170) designated by the user. As discussed above, the area of interest can be displayed in a web clipping.

Generally, a clipping presents a portion of content contained within an area of interest selected with respect to a content source (e.g., where the content source is a web page, a web clipping can be used to present a designated portion of the web page). For example, to create a clipping: content is identified and a view of the content is presented (e.g., as a window), which displays the content. The view can be shaped (or reshaped), sized (or resized) and positioned (or repositioned) and the content can be repositioned within the view to reposition the area of interest. The area of interest is that portion of the content source that is positioned to be displayed in the view window.

Presenting a view may include, for example, (1) identifying a default (or user specified, for example) size, shape and screen position for the view, (2) accessing parameters defining a frame for the view including shape, form, size, etc., (3) accessing parameters identifying the types of controls for the view, as well as display information for those controls that are to be displayed, with display information including, for example, location, color, and font, and (4) rendering the view.

In clipping content from a content source, information can be obtained about the configuration of the application from which the content was clipped. Such configuration information may be required to identify the area of interest within the content source. For example, when a web page is accessed from a browser, the configuration of the browser (e.g. size of the browser window) may affect how content from the web page is actually displayed (e.g., page flow, line wrap, etc.), and therefore which content the user desires to have clipped.

In various implementations, the user interface of the clipping is referred to as a clipview (e.g., where if the content source is a webpage, the clipview can be referred to as a webview). The clipview includes a first portion including the clipped content and a second portion for presenting the clipped content. The first portion is referred to as a view portion in which clipped content is displayed, and the second portion is referred to as a frame which might also include controls. Implementations need not include a perceivable frame or controls, but may, for example, present a borderless display of clipped content, and any controls may be, for example, keyboard-based controls or mouse-based controls without a displayable tool or activation element, overlay controls, on screen controls or the like. The presentation typically includes a display of the clipped content. The clipview also may include one or more additional portions for presenting information such as, for example, preferences settings and an identifier of the content source. The display of the clipview may be in the user interface of a device, part of a layer presented in the user interface (e.g., as part of an overlay or an on-screen display).

Figure 1B:
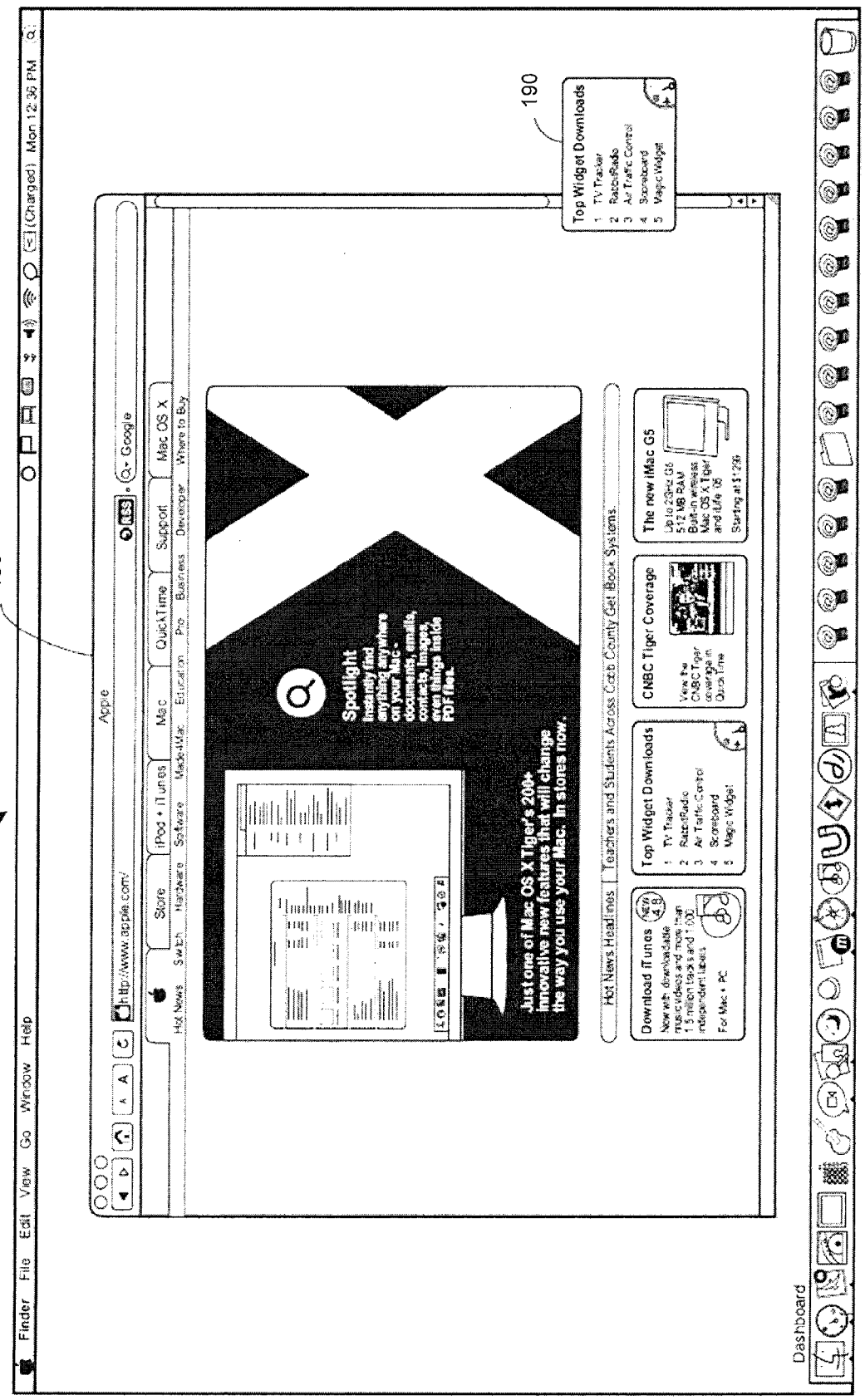
FIG. 1B is a screenshot of an example web clipping as presented in a graphical user interface.

FIG. 1B is a screenshot 180 of a web clipping 190 presented in a graphical user interface. The screenshot 180 also includes a web browser 185 presenting a web page from which the web clipping 190 was created. Notice that the web clipping 190 presents only a portion of the web page presented in the web browser 185. The web clipping 190 can be presented with other clips or views of other content. The clips or view can presented together (e.g., on a dashboard or a unified interest layer).

Referring again to FIG. 1A, the area of interest (e.g., selection 170) can include as much or as little of the document as a user (or the system) may desire. In some implementations, the area of interest can be positioned anywhere relative to the visual representation of the document. In some implementations, the area of interest can be defined, resized, repositioned or otherwise manipulated in response to user input (e.g., mouse, keyboard, tablet, touch-sensitive screen, etc.).

The cursor 165 (e.g., a mouse cursor) can be used to provide user input to resize the area of interest (e.g., the selection 170). In response to the resizing, the area of interest can be automatically aligned with boundaries of the various structural elements 110-150 that are included in the document 105. For example, by selecting the rightmost vertical edge of the area of interest (e.g., the rightmost corner of the selection 170) and moving the cursor 165 in a substantially horizontal direction (e.g., as with a drag-and-drop mouse operation), an area of interest (e.g., the selection 170) can be resized. In response to the horizontal movement, the right vertical edge of the area of interest (e.g., selection 170) can automatically (e.g., by the system) be adjusted to align with structural elements (e.g., vertical boundaries thereof) within the document. The alignment of an object (e.g., the area of interest), or portion thereof, with another object (e.g., the structural element) is referred to herein as "snapping to" (e.g., the top of the area of interest is snapped to the top of the structural element) or just "snapping".

In some implementations, when the area of interest is snapped to align with a structural element, the edge of the area of interest is automatically adjusted to coincide with the boundary of the structural element. For example, the right vertical edge of the area of interest (e.g., selection 170) can be adjusted to be coincident with the left or right vertical edge of element 120. In response to receiving input moving the cursor 165 to the left, the right edge of the area of interest can be aligned with the left boundary of element 120, as depicted by the dotted line 173. Alternatively, in response to receiving user input moving cursor 165 to the right, the right edge of the area of interest can be aligned with the right boundary of element 120, as depicted by the dotted line 177.

In some implementations, an area of interest is snapped to a structural element only if the area of interest (e.g., a boundary associated with the area of interest that is being adjusted) moves sufficiently close to the boundary of the element. For example, to a user providing user input, the user may perceive that the area of interest is, effectively, magnetically-attracted to a boundary of the structural element. An area of interest is snapped to the boundary (e.g., fixed despite user input to the contrary) until the magnitude of the user input surpasses a threshold (e.g., a maximum snap distance, such as ten pixels). Automatically adjusting an area of interest by snapping the area's edges to that of a structural element allows a user to easily define the area of interest that is aligned with structural elements (e.g., as compared to requiring the user to manually and precisely identify the area of interest).

Figure 2A:
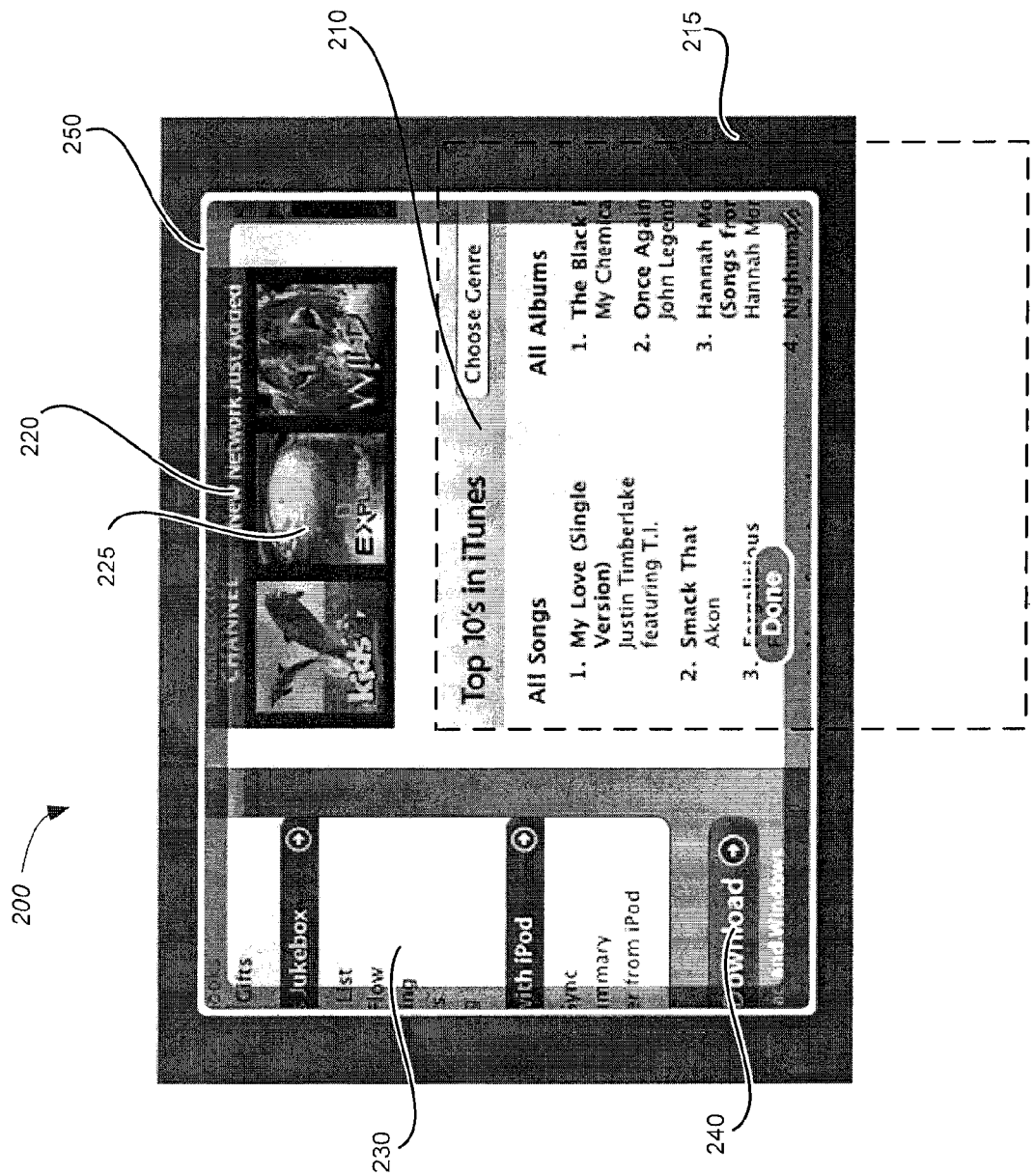
FIG. 2A is a screenshot of an example web clipping.

FIG. 2A is a screenshot 200 of an example web clipping 250. The web clipping 250 is associated with an electronic document, a portion of which is presented with the web clipping 250. The electronic document includes various structural elements. For example the document includes tables 210, 230 and 240. The document also includes a section 220 which includes at least three nested elements exemplified by the image 225.

As evident from the screenshot 200, the presentation of the web clipping includes a presentation of less than the complete document. Indeed, most elements of the document are only presented partially within the web clipping. For example, the element 210 is only partially depicted. The outline 215 indicates the boundary of the element 210. The outline 215 of the element 210 represents the spatial extent of the element 210, if the element was entirely presented. In other words, if the web clipping 250 was enlarged to include the area bounded by the outline 215, then the entire element 210 would be depicted within the web clipping 250. In some implementations, enlarging the web clipping 250 results in enlarging the clipping's corresponding area of interest.

Figure 2B:
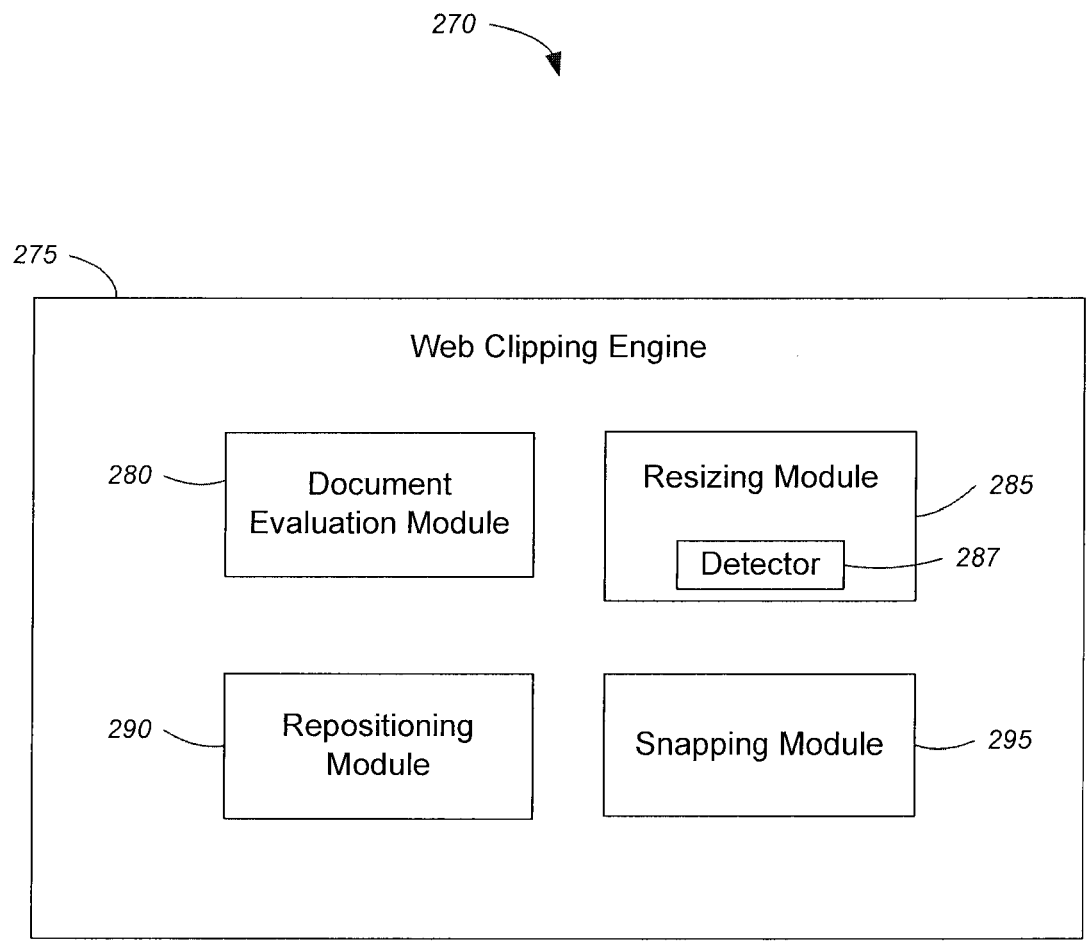
FIG. 2B is diagram for an example apparatus for manipulating content for presentation to a user.

Alternatively, the content depicted within the web clipping 250 can be repositioned (or panned) (e.g., while maintaining the same size of the web clipping, the area of interest can be re-focused or moved). In one implementation, repositioning the content within the clipping does not change the dimensions of the clipping or the dimensions of the clipping's corresponding area of interest. Rather, repositioning the content is essentially the same as repositioning the clipping's associated area of interest with respect to the document. For example, a user may provide user input indicating that the area of interest be repositioned such that the element 210 is completely presented within the clipping Referring now to FIG. 2B, a structure for an example apparatus 270 for manipulating content for presentation to a user is shown. The apparatus can be associated with an electronic system having a display (not shown). The apparatus 270 can be of the form of software, hardware or combinations of the two. The apparatus 270 includes a web clipping engine 275 that includes at least four modules (a document evaluation module 280, a resizing module 285, a repositioning module 290, and a snapping module 295).

The document evaluation module 280 is operable to evaluate a document including identifying structural elements within a document. The evaluation can include determining a number of structural elements and their respective locations in the document including boundaries. In some implementations, the document evaluation module 280 is also operable to form lists of edges associated with the structural elements, sort the lists, and evaluate and purge the lists of irrelevant edges based on one or more criteria. Document evaluation is discussed in greater detail in association with FIG. 3.

The resizing module 285 is operable to receive user input to resize an area of interest associated with, for example, a web clipping. In the implementation shown, the resizing module 285 includes a detector 287. A detector 287 is operable to detect user input (e.g., selection of a corner, or an edge of a web clipping), for enabling re-sizing. In one implementation, the detector 287 is responsive to receipt of user input selecting an edge of an area of interest (e.g., an edge of selection 170) and triggers a resizing of the area of interest including snapping to one or more structural elements of the document. Resizing is described in greater detail below with reference to FIGS. 3 and 4A-B.

The repositioning module 290 is operable to reposition a content selection with reference to an area of interest, such as associated with a web clipping. Repositioning is discussed in greater detail below in association with FIGS. 3, and 6A-C.

Snapping module 295 is operable to evaluate user input, and automatically snap a user selection to one or more boundaries associated with structural elements of a document. The snapping module 295 evaluates relevant boundaries as identified, by for example, the document evaluation module 280. Snapping module 295 is operable to evaluate a list of relevant edges, identifying a most relevant edge, and snapping the area of interest to the most relevant edge. Snapping is discussed in greater detail below in association with FIG. 3.

Figure 3:
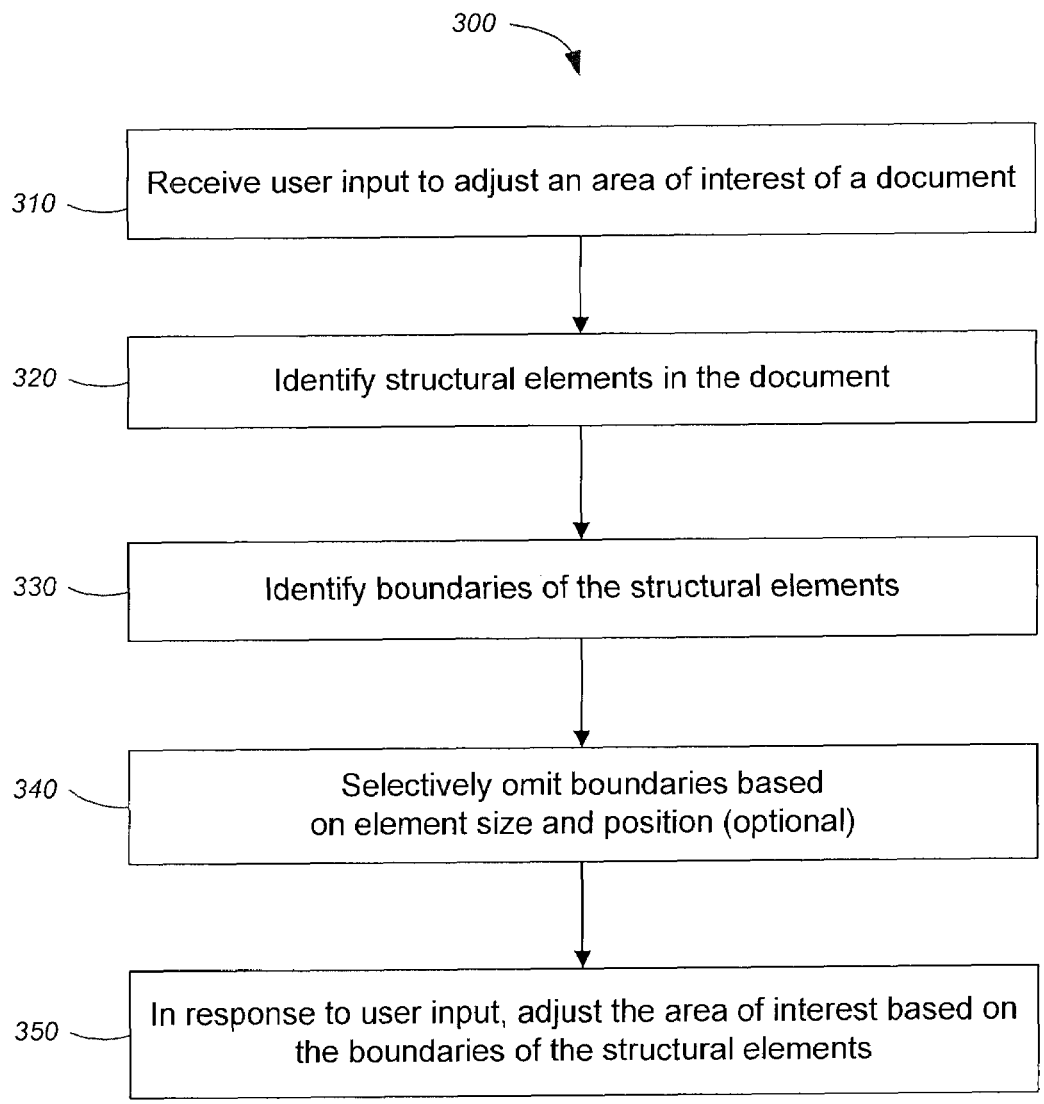
FIG. 3 is a flow diagram of an example process for adjusting an area of interest.

FIG. 3 shows an example process 300 for adjusting an area of interest. The area of interest identifies or selects a portion of an electronic document with respect to the document's visual representation. In some implementations, the area of interest can be associated with a web clipping. The area of interest can be manipulated (e.g., sized and positioned) directly with respect to the presentation of the document (e.g., before the web clip is created), or can be manipulated indirectly (e.g., by manipulating a web clip with which the area of interest is associated).

The process 300 includes receiving user input to manipulate an area of interest (step 310). In some implementations, an area of interest can be resized by selection and movement of one or more of the area's edges (e.g., as detected by detector 287). For example, selecting and moving the edge of an area of interest makes it larger or smaller. Resizing an area of interest is described in detail in reference to FIGS. 4A-4B. Alternatively, the area of interest can be repositioned or panned relative to the content of the document, without changing the size of the area. Repositioning an area of interest is described in detail in reference to FIGS. 6A-6C. In some implementations, the area of interest can be repositioned by moving the location of the area of interest with respect to a static presentation of the document (e.g., moving the area of interest presented in the web clipping by moving the web clip while fixing the document in place). Alternatively, the area of interest can be repositioned by panning the content within the area of interest (e.g., the position of the content within the area of interest is changed while the position of the area of interest remains static, as described in further detail below in reference to FIGS. 4A-B). In some implementations, user input manipulating an area of interest includes the user input received to initially define the area of interest (e.g., receiving user input defining a bounding box such as the selection 170 shown in FIG. 1A).

The process 300 includes identifying structural elements in the document (step 320). For example, document evaluation module 280 can identify each structural element in the document including spatial extents thereof. In some implementations, all structural elements that have a visual representation in the document can be identified. For example, in a web page, encoded in the Hypertext Markup Language (HTML) or extensible HTML (XHTML), all structural elements including document sections (e.g., delineated by the <DIV> tag), images, tables and table elements (e.g., individual rows, columns or cells within a table) are identified. In some implementations, inline elements, which are typically elements that affect the presentation of a portion of text but do not denote a particular spatial extent, can be ignored or omitted (i.e., not identified). Alternatively, inline elements can be considered structural elements. For example, when an inline element inherently implies structure (e.g., an image delineated by an <img> tag) or when a document author has identified a particular inline element as structural, such implicit or explicit structural designation can be used in the identification of elements. For example, authors may use a normally inline element (e.g., the anchor <a> tag) and use the element as a structuring element (e.g., use a cascading style sheet (CSS) to style the element as a block, where the style of each element is determined (e.g., according to a document's associated CSS) for each document). In some implementations any element that is not visible in the presentation of the document can also be omitted from identification.

The process 300 includes identifying the boundary of each identified structural element (step 330) (e.g., by the document evaluation module 280). All of the identified structural elements have a spatial extent that can be described by a boundary having, for example, horizontal and vertical edges (e.g., a bounding box). In one implementation, the structural elements are sorted according to the horizontal and vertical position of each boundary's edge in the presentation of the document. In some implementations, each individual boundary (e.g., top, bottom, left and right edge, assuming a rectangular bounding box) of each structural element is sorted based on the position of each boundary. In such implementations, all of the vertical and horizontal boundaries of a document's structural elements can be sorted into two separate groups: horizontal boundaries and vertical boundaries. A document may include hundreds of structural elements, so sorting the boundaries increases the efficiency with which one or more boundaries in a particular location (e.g., near an area of interest) can be subsequently identified.

The process 300 can optionally include selectively omitting particular boundaries from further processing (e.g., by the document evaluation module 280) based on, for example, the size and position of each element's respective boundary (step 340). In some implementations, the boundaries of elements that are not large enough can be omitted. For example, elements whose boundary describes a size less than 10% the size of the area of interest can be omitted. In some implementations, all boundaries except those of largest elements within the area of interest can be ignored.

In some implementations, if an element is too large, then the element's boundaries can also be ignored. For example, if an element is larger than one and a half times the size of the area of interest, then the element's boundaries can be ignored.

In some implementations, boundaries that are oriented contrary to the manipulation of the area of interest can be ignored. If an area of interest is being panned or resized in a horizontal orientation (e.g., making the area wider), then the horizontal boundaries of all elements can be ignored. Likewise, can vertical boundaries be ignored when the area of interest is being manipulated in a vertical orientation. For example, in FIG. 1A, when the right edge of the selection 170 is moved left or right, the horizontal boundaries of all elements (e.g., the top and bottom of element 120), can be ignored. Similarly, the boundaries of elements that are located in a direction contrary to the direction which the area of interest is being manipulated can also be ignored. For example, if an area of interest is being resized by moving a particular edge of the area in a leftward direction, then all of the boundaries that are to the right of the particular edge can be ignored.

In some implementations, the "near side" boundary of an element can also be ignored. The near side boundary of an element is a boundary that delineates the beginning of an element rather than the element's end relative to the area of interest. In other words, if an area of interest were snapped to a boundary of an element, but none of the element would be thus included in the area of interest, then the boundary can be omitted. For example, in such an implementation, the selection 170 in FIG. 1A would not snap to the boundary identified by the dotted line 173. Instead, the selection 170 can be snapped to the right boundary of element 130 (e.g., the dotted line 177).

In some implementations, the boundaries of elements can be ignored if only a relatively small portion (e.g., 30%) of the element is presented within the area of interest. For example, in FIG. 1A, when the selection 170 is manipulated, the boundaries of the structural element 120 can be ignored because only a small portion of the element 120 is presented within the area of interest (e.g., the shaded portion of element 120).

The process 300 includes adjusting the area of interest in response to user input based on the boundaries of the structural elements (step 350) (e.g., by the resizing module 285 or the repositioning module 290 and the snapping module 295). The size or position of the area of interest, depending on the operation being performed by the user (e.g., reposition or resize), is adjusted to align with one or more of the nearest identified boundaries (e.g., using the snapping module 295). In some implementations, when the area of interest is being repositioned, only the top and left edges of the area of interest are considered while determining whether the area of interest is sufficiently near an identified boundary (e.g., as described below in reference to FIGS. 4A-B).

Figures 4A, 4B:
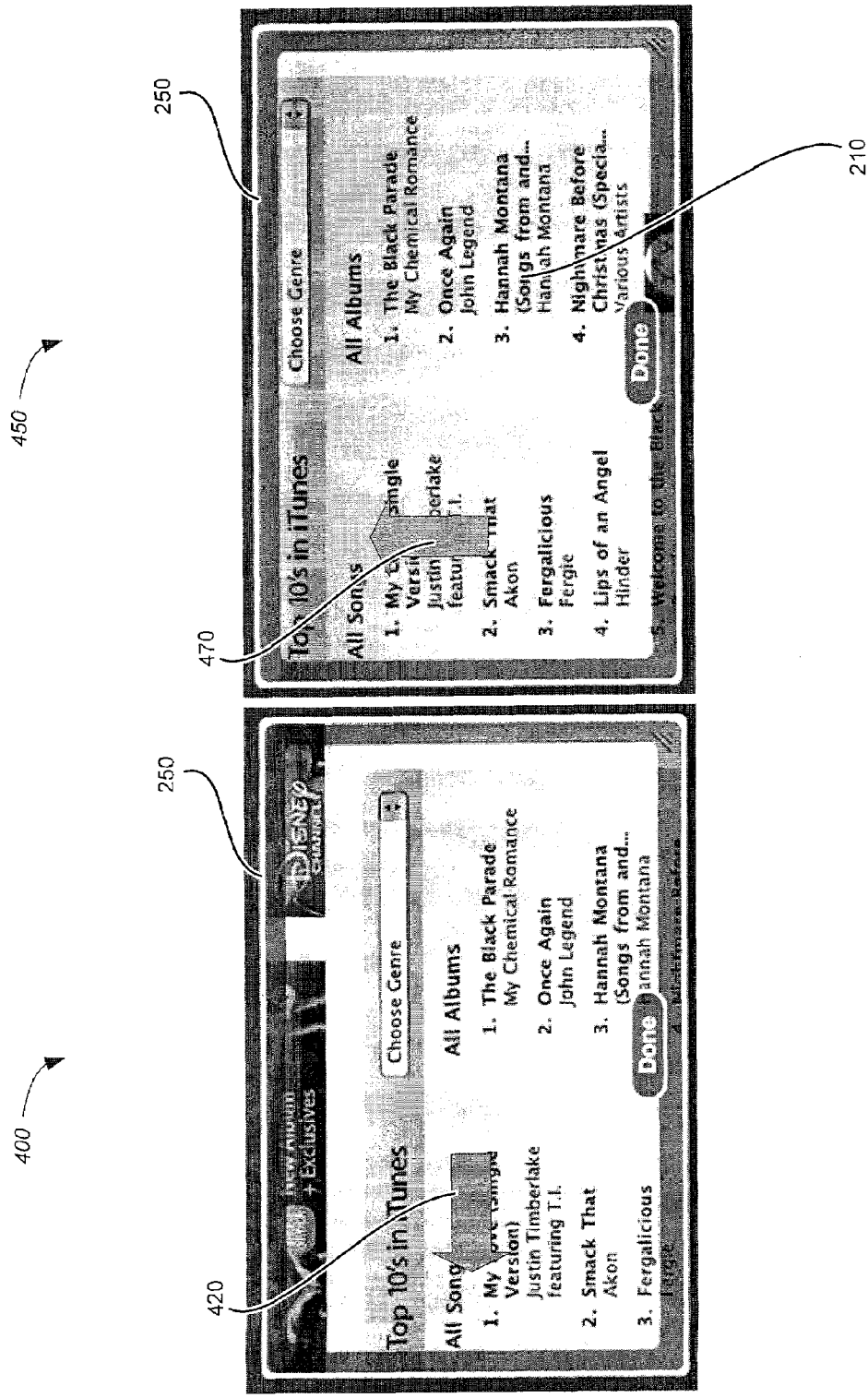
FIG. 4A is a screenshot of an example web clipping after automatic horizontal repositioning.
FIG. 4B is a screenshot of the example web clipping after automatic vertical repositioning.

FIG. 4A is a screenshot 400 of the web clipping 250 as presented after automatically adjusting a horizontal repositioning of the web clipping's area of interest. When compared to the earlier depiction of the web clipping 250 in FIG. 2A, the clipping's area of interest has been repositioned by panning the content leftward (e.g., corresponding to the arrow 420). The left vertical boundary of the structural element 210, a table, has been used to align the repositioned area of interest. The edge of the structural element 210 is coincident with the edge of the clipping 250.

FIG. 4B is a screenshot 450 of the web clipping 250 as presented after automatically adjusting a vertical repositioning of the web clipping's area of interest. The clipping's area of interest has been repositioned by panning the content upward (e.g., corresponding to the arrow 470). The top horizontal boundary of the structural element 210 has been used to align the repositioned area of interest. The top edge of the structural element 210 is coincident with the edge of the clipping. In response to the horizontal and vertical repositioning, the clipping's area of interest has been easily repositioned by the user to align two edges of the element 210 with the web clipping 250.

In some implementations, both horizontal and vertical boundaries can both be considered simultaneously during automatic alignment of an area of interest. For example, if the user in the previous example had repositioned the content diagonally upward and leftward, then the clipping's area of interest can be repositioned to align with both the top and left edges of the structural element 210 simultaneously (e.g., in response to the singular diagonal user movement), as shown in FIG. 4B.

Figure 5B:
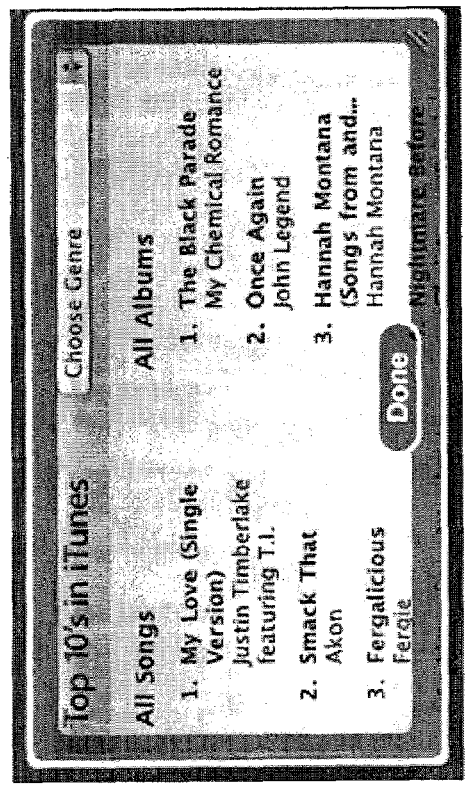
FIG. 5B is a screenshot of the example web clipping after automatic resizing.
Figure 5A:
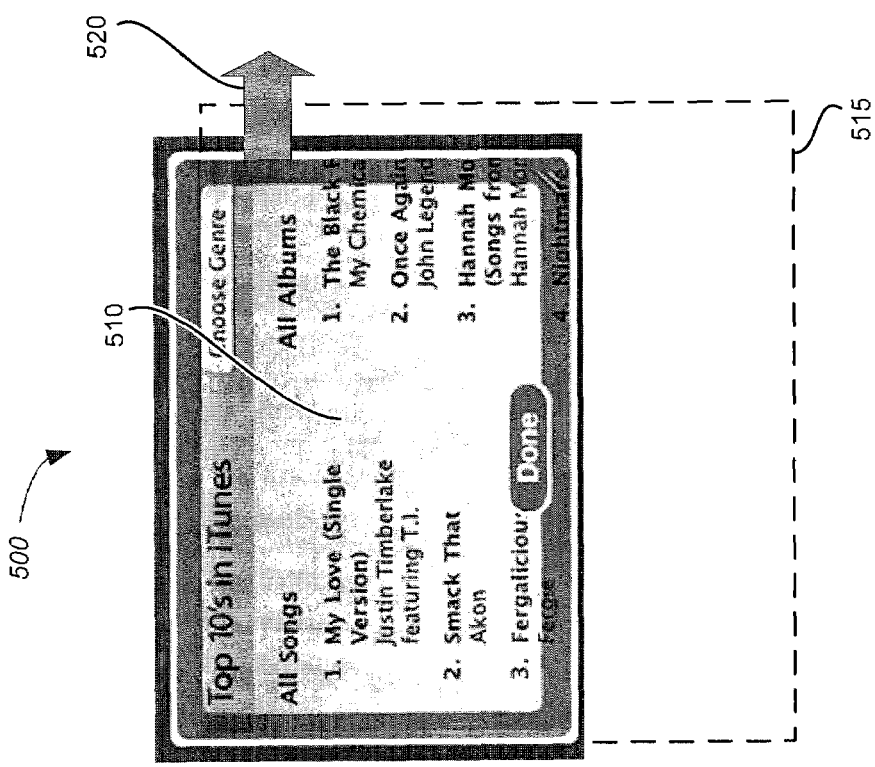
FIG. 5A is a screenshot of an example web clipping being resized (enlarged).

FIG. 5A is a screenshot 500 of an example web clipping presenting a portion of a structural element 510 where the web clipping is about to be resized (enlarged). As is evident from the screenshot 500, the top and left edges of the boundary of the element 510 are aligned with the edges of the web clipping, however, given the size of the clipping, the right side of the element 510 is not presented. The arrows 520 represent user input indicating that the web clipping, and thus the clipping's associated area of interest, be resized. The dotted line 515 represents the spatial extent and boundary of the element 510 if the element 510 were completely presented.

FIG. 5B is a screenshot 550 of the same web clipping shown in screenshot 500 after the clipping's area of interest has been automatically adjusted in response to resizing represented by the arrows 520. Although the user input 520 exceeds the right boundary of the element 510 (e.g., compare the arrow 520 with the boundary 515), the clipping is automatically resized so that the edge of the clipping is aligned with the right edge of the structural element 510.

Figure 6A:
FIG. 6A is a screenshot of an example web clipping being resized (reduced).

FIG. 6A is a screenshot 600 of an example web clipping presenting more than an entire element 610. As is evident from the screenshot 600 the element 610 is entirely presented within the web clipping, however other parts 620 (e.g., the part of the document to the right of the element 610) of the document are also being presented in the web clipping. The arrow 630 represents user input indicating that right edge of the web clipping be moved, thus resizing the web clipping and the clipping's area of interest.

Figure 6B:
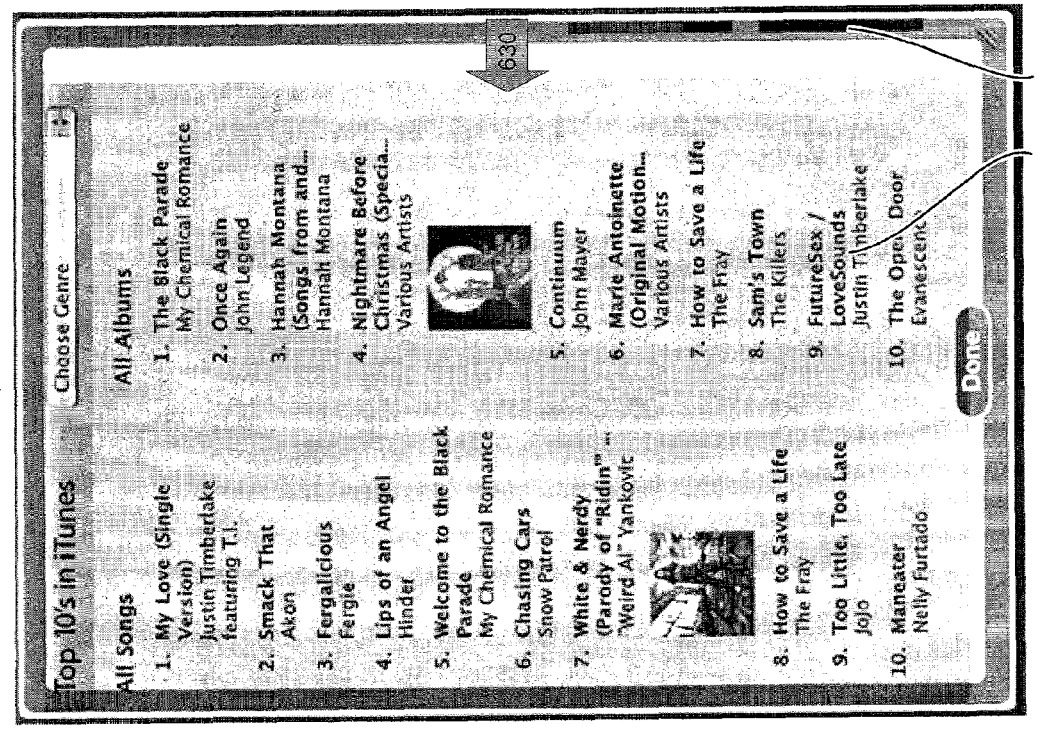
FIG. 6B is a screenshot of the example web clipping after automatic resizing.

FIG. 6B is a screenshot 650 of the same web clipping shown in the screenshot 600 after the clipping's area of interest has been automatically adjusted in response to the resizing represented by the arrow 630. Although the user input 630 exceeds the right boundary of the element 610, the clipping is automatically resized so that the right edge of the clipping is aligned with the right edge of the structural element 610. The arrow 670 represents user input indicating that the bottom edge of the web clipping be moved, thus resizing the clipping and the clipping's area of interest.

Figure 6C:
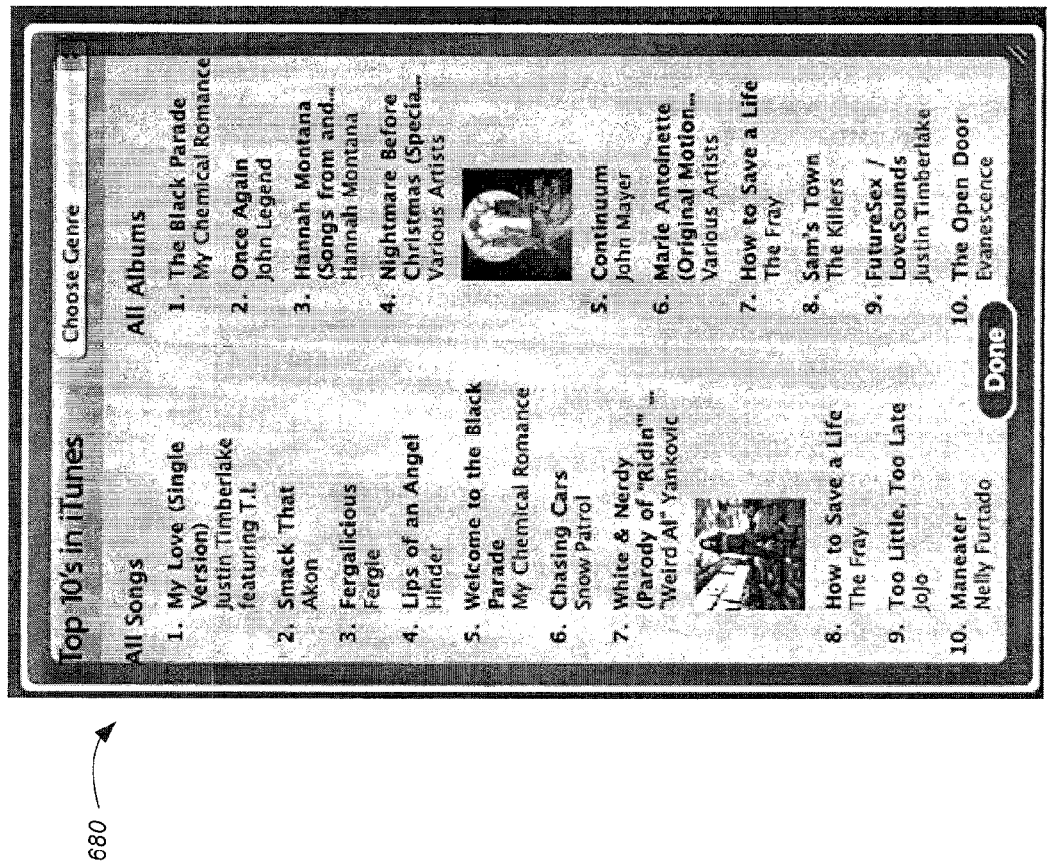
FIG. 6C is a screenshot of the example web clipping after further automatic resizing.

FIG. 6C is a screenshot 680 of the same web clipping shown in the screenshot 650 after the clipping's area of interest has been automatically adjusted in response to the resizing represented by the arrow 670. Although the user input moves the edge of the clipping somewhat short of the bottom edge of the structural element 610, the clipping is automatically resized so that the bottom edge of the clipping is aligned with the bottom edge of the structural element 610.

In some implementations, if an area of interest is resized, then the area can be snapped to the edges of a structural element only if a structural element is already aligned with the area of interest. For example, if the structural element is already aligned with the top and right edges of the area of interest, then the left and bottom edges of the same structural element can be used to snap the area of interest's left and bottom edges during resize. For example, in both FIGS. 6A and 6B, the area of interest is already aligned with structural element 610, thus making the boundaries of the structural element 610 eligible for being snapped-to.

Figure 7:
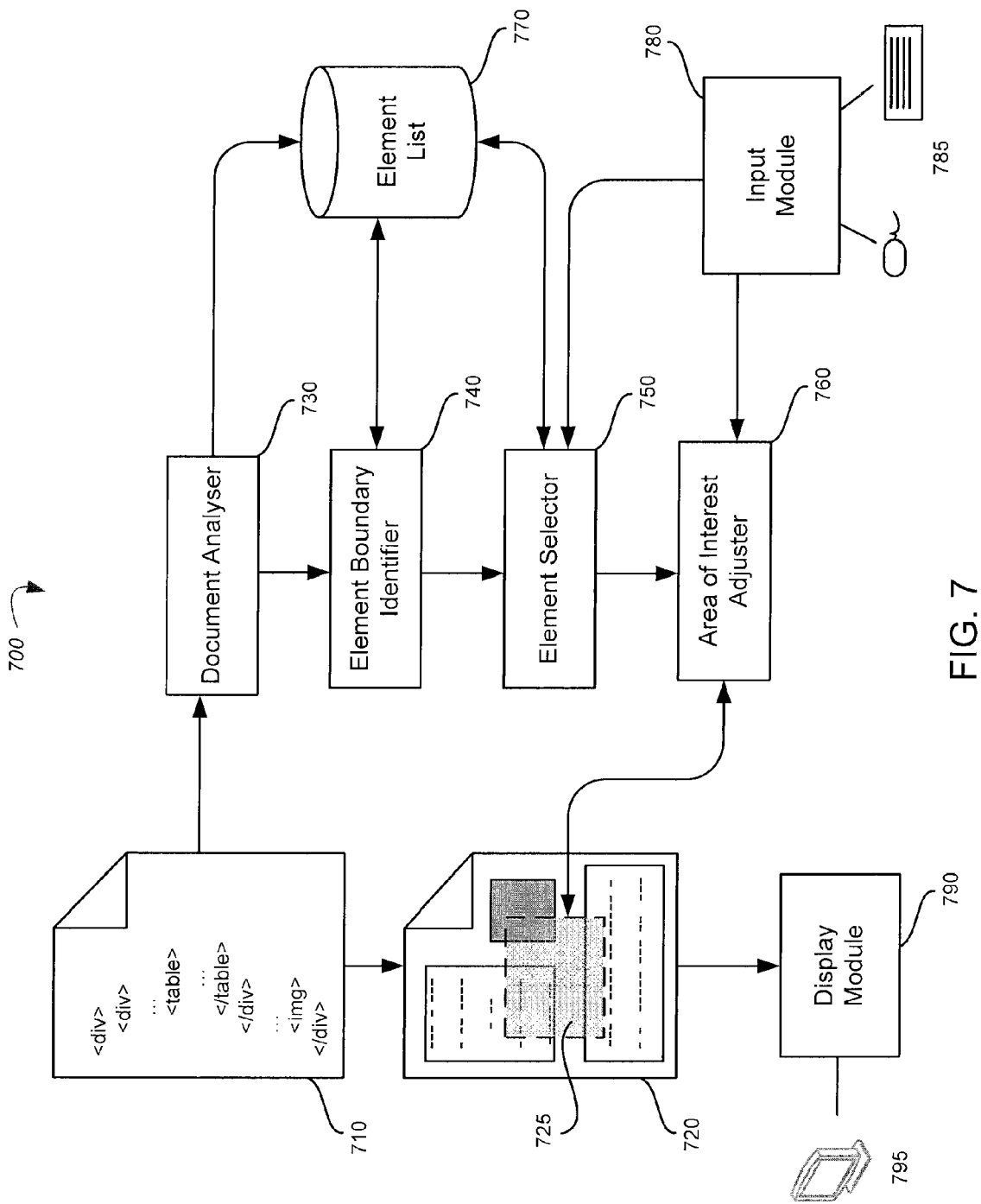
FIG. 7 is a diagram of an example system for adjusting an area of interest with respect to the structural elements of a document.

FIG. 7 is a diagram of an exemplary system 700 for adjusting an area of interest with respect to the structural elements of a document. The system 700 generally includes modules (e.g., modules 730-760 that perform functions similar to the modules discussed above with respect to FIG. 2B) and resources (e.g., document 710). A module is typically a unit of distinct functionality that can provide and receive information to and from other modules. Modules (e.g., display module 790) can facilitate communication with input or output devices (e.g., display devices 795). Modules can operate on resources. Generally, a resource is a collection of information that is operated on by a module. In some implementations, however, a module that provides information to another module can behave like a resource and vice-versa.

The system 700 includes document 710 which includes content. The content of the document 710 includes structural elements. The structural elements of the document 710 are apparent in the presentation 720 of the document. All or part of the document's presentation 720 can be presented by the display module 790 on a display device 795. The document's structural elements have a spatial extent (e.g., a position, height and width) in the presentation 720 of the document 710. Depending on the particular circumstances of the document's presentation (e.g., the display device, the application presenting the document, the size of the application's window, etc.) a structural element's spatial extent may vary. For example, a particular structural element presented in a display device is 100 pixels wide by 200 pixels high, while on another display device the same structural element is 200 pixels wide by 100 pixels high.

The system 700 includes an identifier 725 for identifying an area of interest. As discussed above, the area of interest identifies a portion of the document's presentation 720. The area of interest can be adjusted (resized and repositioned) in conjunction with an area of interest adjuster 760. The area of interest adjuster 760 can receive user input from an input module 780 attached to one or more input devices 785. The user input indicates a particular area of interest manipulation (e.g., resizing or repositioning). For example, a user can use a mouse to select an edge of the area of interest to move the edge and thereby resize the area of interest. The area of interest adjuster 760 can optionally adjust the area of interest automatically to align the area of interest with one or more selected structural elements in the document.

The system 700 includes a document analyzer 730, which identifies structural elements from the document 710. The document analyzer 730 can parse the document's content to determine structural elements. In some implementations, this document's elements are expressed in a document object model (DOM), a hierarchy of elements, which contains some elements that are structural and some that are not. The document analyzer 730 can determine which of the elements are structural and which elements can potentially be used for alignment (e.g., omitting small or hidden structural elements). The document analyzer 730 can record each structural element as a list of elements 770, in effect flattening the hierarchy structured elements (e.g., as specified in the document) into a list of elements. The system 700 can include an element boundary identifier 740 which uses the elements identified by the document analyzer 730. In some implementations, the element boundary identifier 740 can use the element list 770. The element boundary identifier 740 determines the spatial extents of each element. In some implementations, the identified boundaries can be used by an element selector 750

The system 700 can include an element selector 750, which selects one or more structural elements (or their boundaries) from among the identified boundaries. The element selector 750 selects potential positions to which an area of interest can be aligned. In some implementations, the element selector 750, may select different elements depending on information received from the input module 780. For example, vertical structural boundaries (e.g., the left and right edges of a structural element) can be selected if an area of interest is being resized horizontally (e.g., resized to be wider or narrower), while horizontal structural boundaries can be selected if the area of interest is being resized vertically.

In general, modules and resources illustrated in the system 700 can be combined or divided and implemented in some combination of hardware or software on one or more computing devices connected by one or more networks.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results.

For example, in some implementations, an area of interest is automatically resized (repositioned) in response to user input, if the user input indicates only a small degree of resizing (repositioning). For example, while a user is resizing (moving) an area of interest quickly (e.g., more than a certain portion of the area of interest over a particular interval of time), the area of interest can be resized (repositioned) exactly in response to the user input, without automatic adjustment.

What is claimed is:

1. A computer-implemented method comprising:
receiving input to adjust a user defined bounding box that encompasses a portion of a web page, the bounding box having user-drawn boundaries and including a portion of a first object rendered in the portion of the web page;
automatically determining that a first edge of the bounding box should coincide with a boundary of a second object and not a boundary of the first object, based at least in part on the portion of the first object encompassed in the bounding box, including:
determining a magnitude of the first portion of the first object; and
determining that the magnitude does not satisfy a threshold;
automatically adjusting the first edge of the bounding box to coincide with the boundary of the second object, not the boundary of the first object, the adjusting resulting in the bounding box encompassing a portion of the second object; and
designating contents of the adjusted bounding box, including the portion of the second object, as a web clipping, where the method is performed by one or more processors.

2. The method of claim 1, where:
the first and second objects are structural elements of the web page.

3. The method of claim 2, where the structural elements correspond to Hyper Text Markup Language (HTML) or Extensible Hyper Text Markup Language (XHTML) elements.

4. The method of claim 1, where:
adjusting the first edge of the bounding box includes moving the bounding box.

5. The method of claim 4, where:
the moving aligns the first edge of the bounding box with the boundary of the second object.

6. The method of claim 1, where:
adjusting the first edge of the bounding box includes resizing the bounding box.

7. The method of claim 1, where determining that the first edge of the bounding box should coincide with the boundary of the second object comprises:
selecting the boundary from among one or more boundaries of the second object based at least in part on a direction of the input.

8. The method of claim 1, where determining that the first edge of the bounding box should coincide with the boundary of the second object comprises:
determining a size of the second object; and selecting the boundary of the second object from among one or more boundaries of the second object based at least in part on the size of the second object.

9. The method of claim 1, where determining that the magnitude does not satisfy the threshold comprises:
determining that the boundary of the first object is not within a snap distance of the first edge of the bounding box.

10. The method of claim 1, where:
the second object is identified according to a style associated with the second object in the web page.

11. The method of claim 1, where:
the second object has one or more boundaries other than the boundary with which the first edge of the bounding box coincides, the other boundaries of the second object not coinciding with any edge of the bounding box.

12. The method of claim 1, further comprising:
receiving a user selection of a second edge of the bounding box; and
adjusting the bounding box based at least in part on a user input to adjust the bounding box.

13. A system comprising:
one or more computers configured to perform operations including:
receiving input to adjust a user defined bounding box that encompasses a portion of a web page, the bounding box having user-drawn boundaries and including a portion of a first object rendered in the portion of the web page;
automatically determining that a first edge of the bounding box should coincide with a boundary of a second object and not a boundary of the first object, based at least in part on the portion of the first object encompassed in the bounding box, including:
determining a magnitude of the portion of the first object; and
determining that the magnitude does not satisfy a threshold;
automatically adjusting the first edge of the bounding box to coincide with the boundary of the second object, not the boundary of the first object, the adjusting resulting in the bounding box encompassing a portion of the second object; and
designating contents of the adjusted bounding box, including the portion of the second object, as a web clipping, where the method is performed by one or more processors.

14. The system of claim 13, where:
the first and second objects are structural elements of the web page.

15. The system of claim 13, where:
the second object is identified according to a style associated with the second object in the web page.

16. The system of claim 13, where determining that the first edge of the bounding box should coincide with the boundary of the second object comprises:
determining a size of the second object; and
selecting the boundary of the second object from among one or more boundaries of the second object based at least in part on the size of the second object.

17. The system of claim 13, where determining that the magnitude does not satisfy the threshold comprises:
determining that the boundary of the first object is not within a snap distance of the first edge of the bounding box.

18. The system of claim 13, where adjusting the first edge of the bounding box includes resizing the bounding box.

19. A computer program product, encoded on a computer-readable storage device, operable to cause a data processing apparatus to perform operations comprising:
receiving input to adjust a user defined bounding box that encompasses a portion of a web page, the bounding box having user-drawn boundaries and including a portion of a first object rendered in the portion of the web page;
automatically determining that a first edge of the bounding box should coincide with a boundary of a second object and not a boundary of the first object, based at least in part on the portion of the first object encompassed in the bounding box, including:
determining a magnitude of the portion of the first object; and
determining that the magnitude does not satisfy a threshold;
automatically adjusting the first edge of the bounding box to coincide with the boundary of the second object, not the boundary of the first object, the adjusting resulting in the bounding box encompassing a portion of the second object; and
designating contents of the adjusted bounding box, including the portion of the second object, as a web clipping, where the method is performed by one or more processors.

20. The product of claim 19, where determining that the first edge of the bounding box should coincide with the boundary of the second object comprises:
selecting the boundary from among one or more boundaries of the second object based at least in part on a direction of the input.

21. The product of claim 19, where determining that the magnitude does not satisfy the threshold comprises:
determining that the boundary of the first object is not within a snap distance of the first edge of the bounding box.

22. The product of claim 19, where determining that the first edge of the bounding box should coincide with the boundary of the second object comprises:
determining a size of the second object; and
selecting the boundary of the second object from among one or more boundaries of the second object based at least in part on the size of the second object.

23. The product of claim 19, where the second object is identified according to a style associated with the second object in the web page.

24. The product of claim 19, where:
the first and second objects are structural elements of the web page.

25. The product of claim 19, where adjusting the first edge of the bounding box includes resizing the bounding box.

26. The product of claim 19, where adjusting the first edge of the bounding box includes moving the bounding box.

27. A system comprising:
means for receiving input to adjust a user defined bounding box that encompasses a portion of a web page, the bounding box having user-drawn boundaries and including a portion of a first object rendered in the portion of the web page;
means for automatically determining that a first edge of the bounding box should coincide with a boundary of a second object and not a boundary of the first object, based at least in part on the portion of the first object encompassed in the bounding box, including:
means for determining a magnitude of the portion of the first object; and means for determining that the magnitude does not satisfy a threshold;
means for automatically adjusting the first edge of the bounding box to coincide with the boundary of the second object, not the boundary of the first object, the adjusting resulting in the bounding box encompassing a portion of the second object; and
means for designating contents of the adjusted bounding box, including the portion of the second object, as a web clipping, where the method is performed by one or more processors.

* * * * *